(12) United States Patent
Randolph et al.

(10) Patent No.: US 7,850,216 B2
(45) Date of Patent: Dec. 14, 2010

(54) GARDEN TOOL HEAD WITH COATED LEADING EDGE

(75) Inventors: David A. Randolph, State College, PA (US); James M. Gross, Lewistown, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 426 days.

(21) Appl. No.: 12/002,713

(22) Filed: Dec. 18, 2007

(65) Prior Publication Data

US 2009/0151082 A1     Jun. 18, 2009

(51) Int. Cl.
*A01B 1/02* (2006.01)
(52) U.S. Cl. .......................................... 294/49; 76/113
(58) Field of Classification Search ............... 294/49, 294/56, 7; 76/1, 109, 111, 113, 119; 172/371–381
See application file for complete search history.

(56) References Cited

U.S. PATENT DOCUMENTS

| 232,456 | A | * | 9/1880 | Clark | 294/54.5 |
|---|---|---|---|---|---|
| 405,407 | A | * | 6/1889 | Goldman | 294/56 |
| 3,328,067 | A | * | 6/1967 | Winkler | 294/54.5 |
| 4,718,708 | A | * | 1/1988 | Zacuto | 294/57 |
| 5,159,769 | A | * | 11/1992 | Odorisio | 37/278 |
| 5,660,421 | A | * | 8/1997 | Krenzler | 294/51 |
| 6,109,362 | A | * | 8/2000 | Simpson, Sr. | 172/375 |
| 2005/0184542 | A1 | * | 8/2005 | Moreschini et al. | 294/54.5 |
| 2008/0301879 | A1 | * | 12/2008 | Prokop | 7/116 |

* cited by examiner

*Primary Examiner*—Dean J Kramer
(74) *Attorney, Agent, or Firm*—Eckert Seamans Cherin & Mellott, LLC; David C. Jenkins, Esquire

(57) ABSTRACT

A garden tool wherein the leading edge of the tool head has a leading edge coated with a hardness enhancing material.

2 Claims, 17 Drawing Sheets

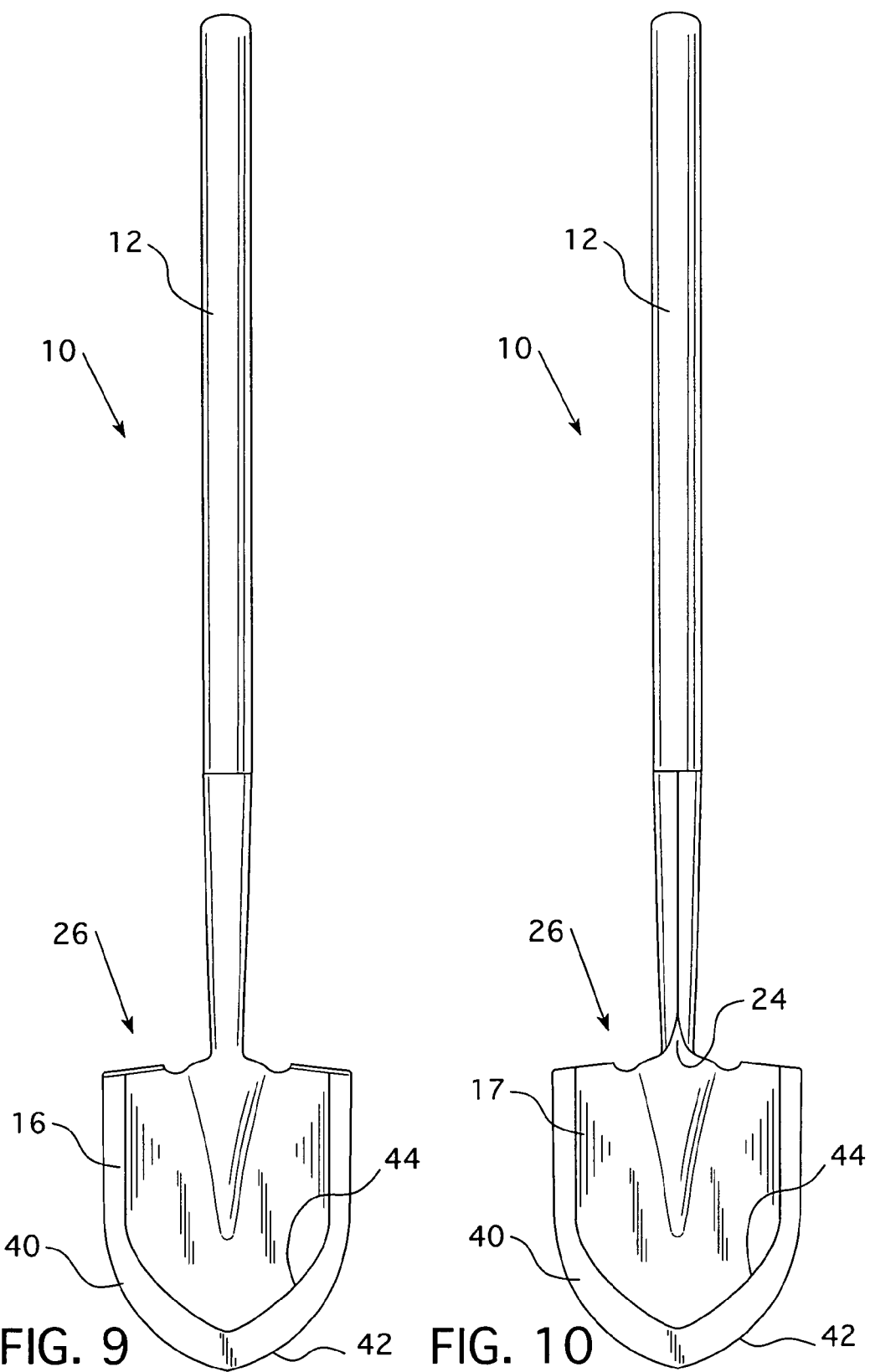

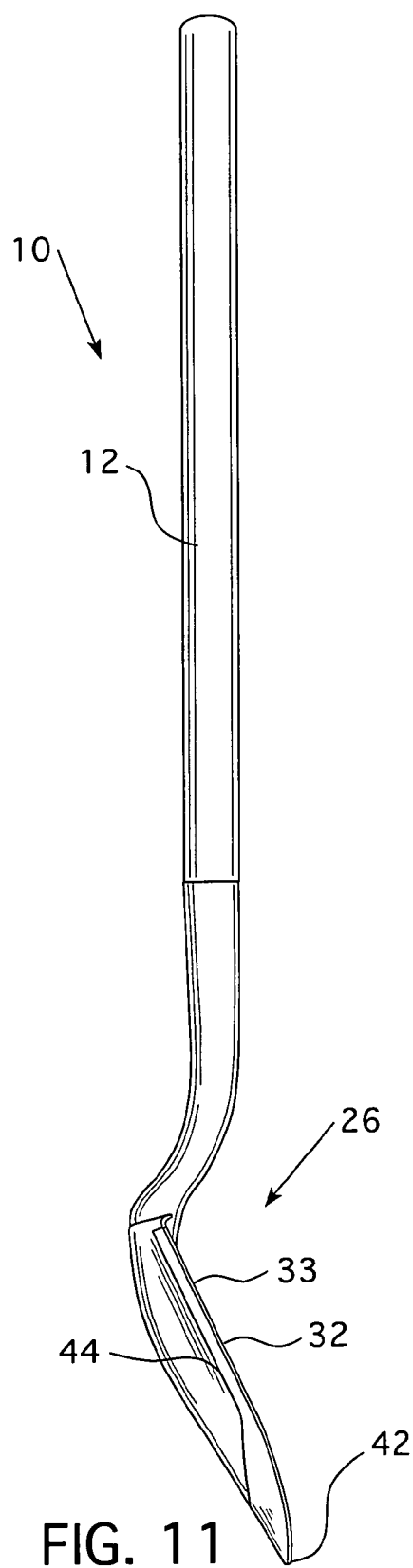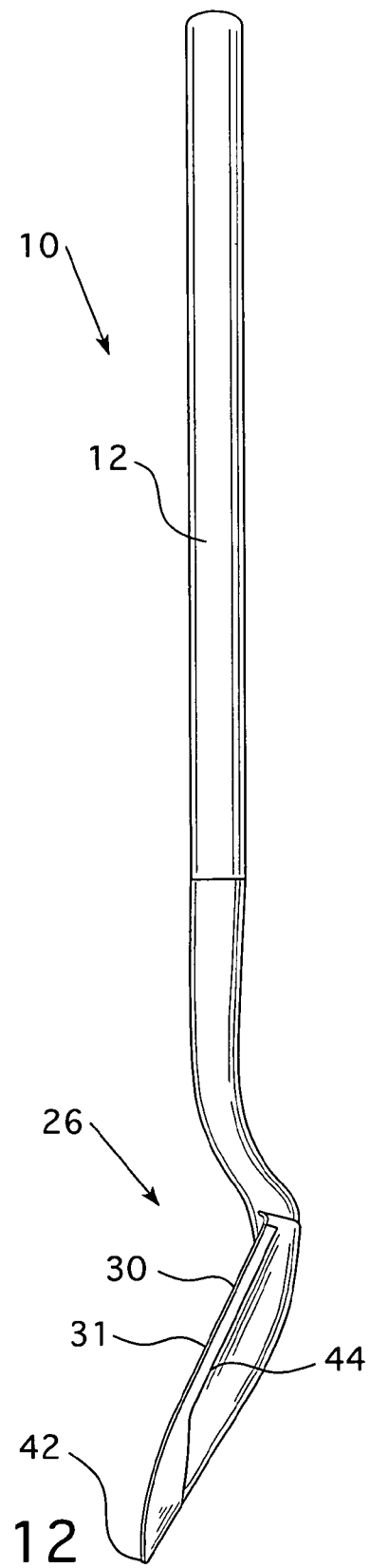

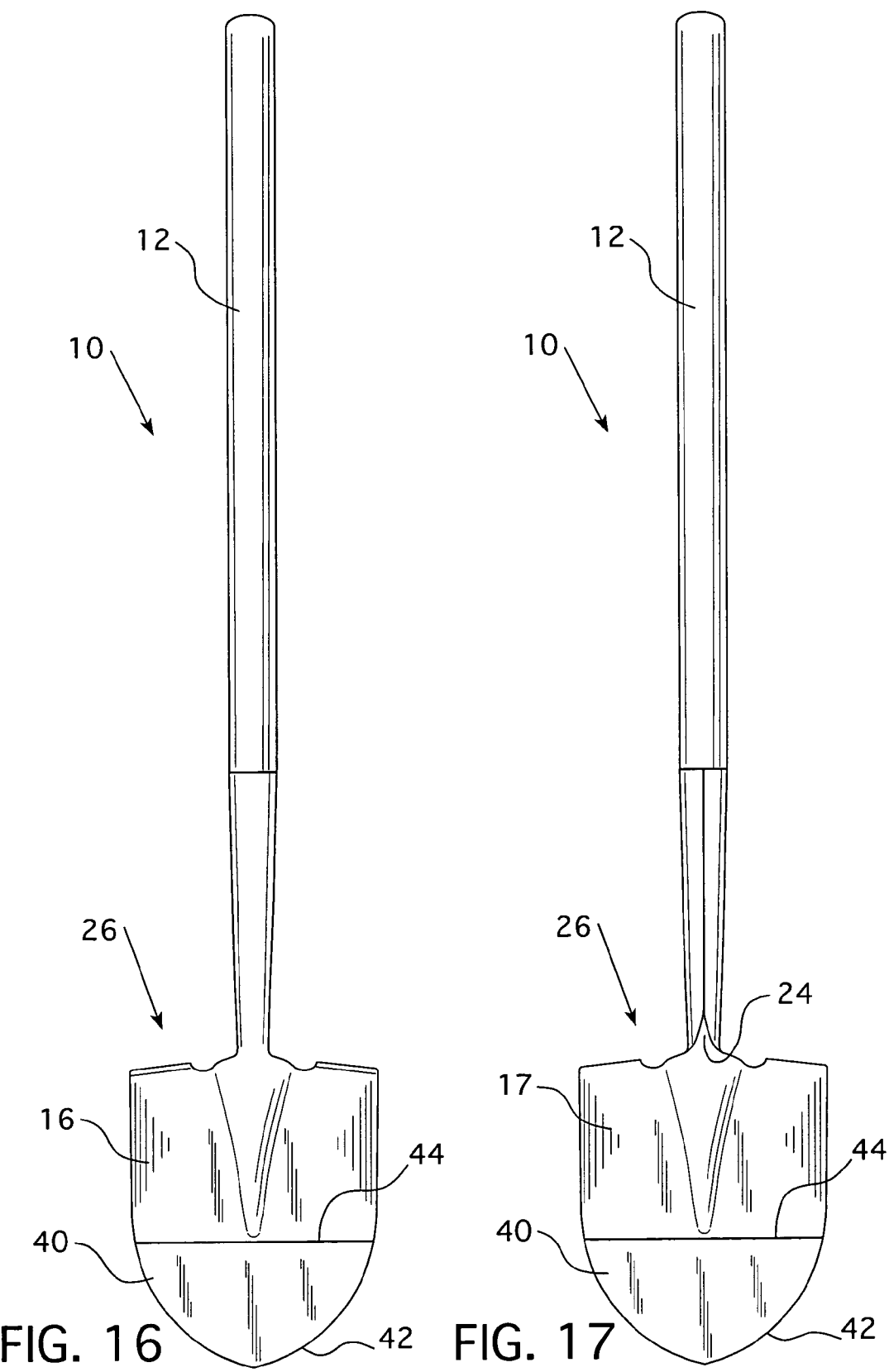

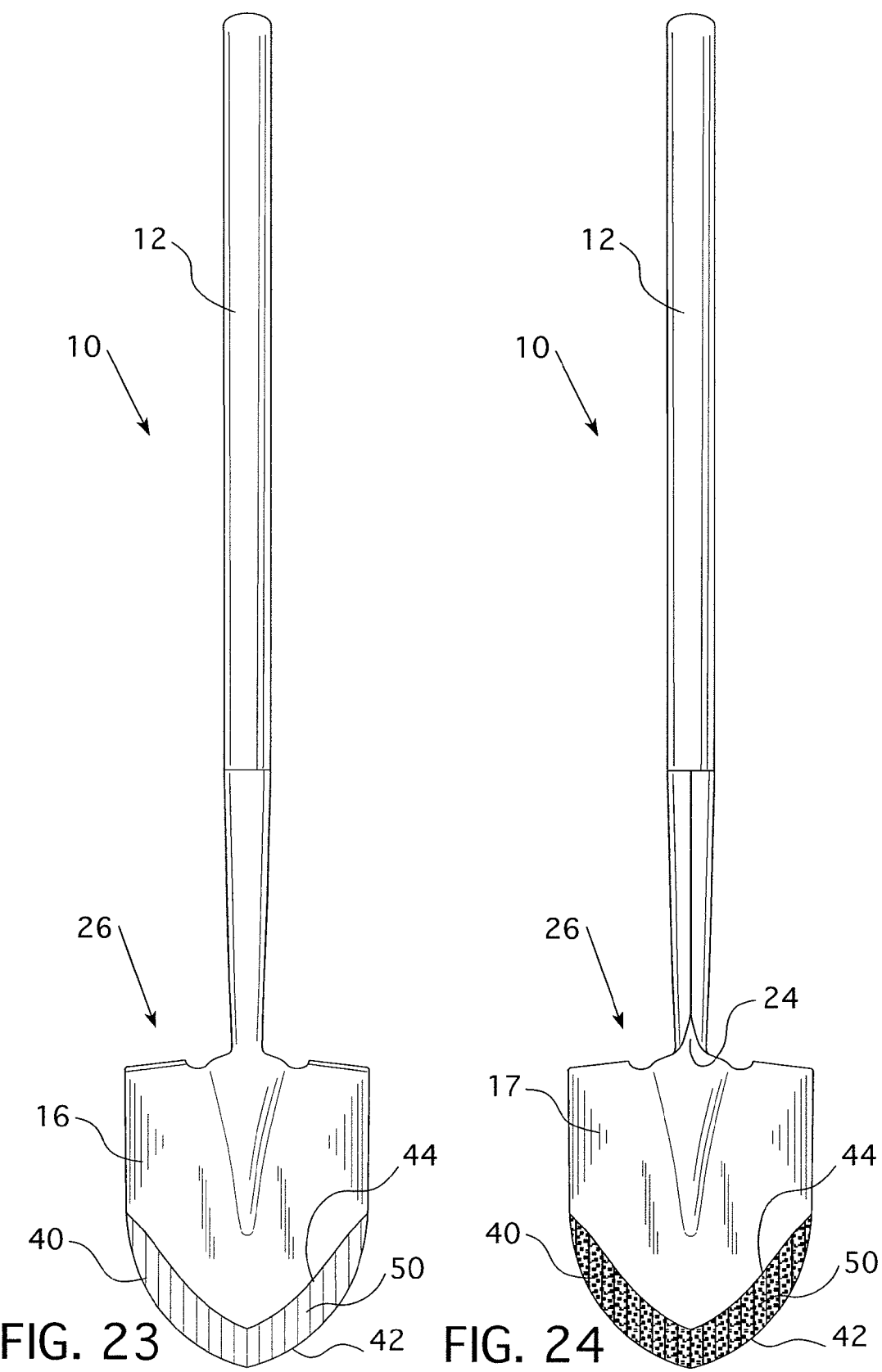

GARDEN TOOL HEAD WITH COATED LEADING EDGE

BACKGROUND OF THE INVENTION

1. Field of the Invention

The disclosed concept relates to a garden tool head having a leading edge coated with a hardness enhancing material.

2. Background Information

Garden tools for manipulating soil are well known in the art. Tools such as, but not limited to, shovels, scoops, spades, rakes, hoes, and scrapers typically include an elongated handle and a metal tool head. The tool head includes a socket structured to be coupled to the handle and a body. The body may be generally flat, e.g., a spade, generally arcuate, e.g., a shovel, or include a bent or angled portion, e.g. a hoe. Further, the body may include a plurality of prongs structured to be inserted into the soil, e.g., a rake. Whatever the shape of the body, there is typically a leading edge opposite the socket that is structured to be inserted into the soil. Thus, the leading edge of the tool head typically is subjected to more wear and tear than the medial portion of the tool head or the socket. That is, the leading edge is generally subjected to more friction and/or contact with debris, e.g. rocks, roots, etc., than the other portions of the tool head; however, because the tool head is made from metal, and is generally harder than the debris encountered, a tool head does not include any coatings or alternate materials structured to protect the tool head at the leading edge.

SUMMARY OF THE INVENTION

The concept disclosed herein provides for a garden tool wherein the leading edge of the tool head has a leading edge coated with a hardness enhancing material. Preferably, the coating is selected from the group comprising: all performance or appearance enhancing coatings including but not limited to tungsten alloys, carbide alloys, titanium alloys, chromium alloys, steel alloys including stainless steels, brass alloys, copper alloys, bronze alloys and ceramics. The coating is preferably applied by a high velocity oxy-fuel process or an electric arc spray. Using such application methods the body of the tool head may be masked to provide a clean line of demarcation between the coated portion and the non-coated portion. The coated portion is, typically, a different color than the metal tool head. Further, the coating material may have a dye, or other coloring agent incorporated therein, to enhance the visual appearance of the coated portion. Further, while the coating is, preferably, generally smooth, the coating process and/or material may include particulate matter that results in a gritty or specked appearance.

The coating may be applied by other means such as, but not limited to, dipping in a reservoir of liquid, plasma spray coating, plasma transferred arc, gas detonation coating, cold gas coating, plating or deposition methods. Such an application method typically results in a generally straight, laterally extending border between the coated portion and non-coated portion of the tool head. However, masking may still be used on the tool head to define the shape of the coated portion. Further, depending upon the nature of the hardness enhancing material, masking may be used to conserve the hardness enhancing material. For example, if the hardness enhancing material is initially in a water based solution, a hydrophobic masking material may be used to repel the hardness enhancing material from the masked material and return the liquid to the reservoir as the tool head is lifted from the reservoir.

BRIEF DESCRIPTION OF THE DRAWINGS

A full understanding of the invention can be gained from the following description of the preferred embodiments when read in conjunction with the accompanying drawings in which:

FIG. 9 is a front view of a garden tool with a coated tool head with another coating pattern.

FIG. 10 is a back view of a garden tool with a coated tool head with another coating pattern.

FIG. 11 is a first side view of a garden tool with a coated tool head with another coating pattern.

FIG. 12 is a second side view of a garden tool with a coated tool head with another coating pattern.

FIG. 16 is a front view of a garden tool with a coated tool head with another coating pattern.

FIG. 17 is a back view of a garden tool with a coated tool head with another coating pattern.

FIG. 23 is a front view of a garden tool with a coated tool head with another coating pattern.

FIG. 24 is a back view of a garden tool with a coated tool head with another coating pattern.

DESCRIPTION OF THE PREFERRED EMBODIMENTS

Figure 1:
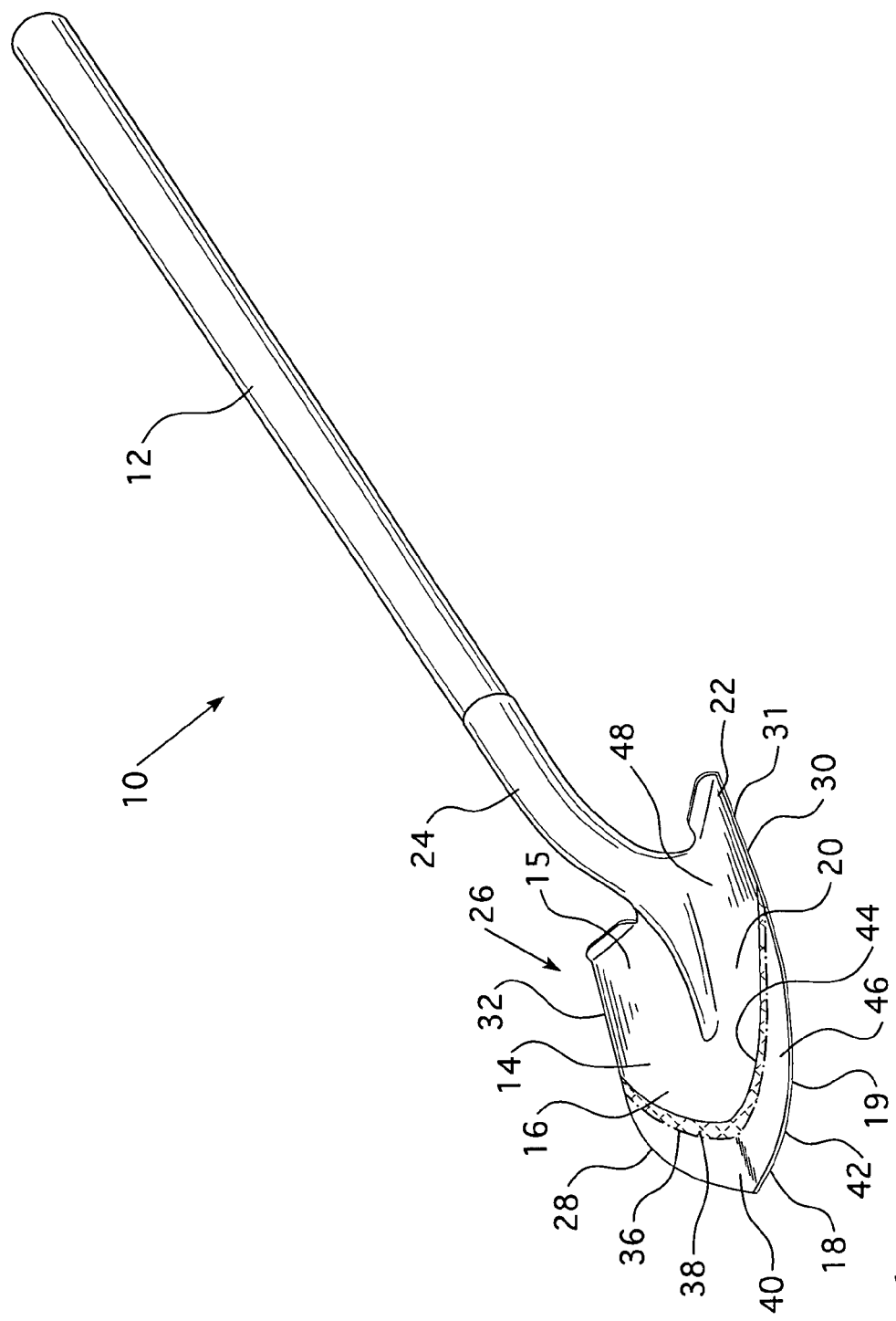
FIG. 1 is an isometric view of a garden tool with a coated tool head.

As shown in FIG. 1-7, a garden tool 10 includes an elongated handle 12 and a tool head 14. It is noted that the size of the handle 12 is adaptable to the purpose of the tool head 14. That is, as shown, the garden tool 10 is a full sized shovel wherein the handle 12 is about five feet long. It is understood that if the tool were a hand shovel (not shown), the handle 12 would be much shorter, typically about 6 inches long. As shown, the tool head 14 is a shovel, however, it is understood that the tool head 14 may be any type such as, but not limited to, scoops, spades, rakes, hoes, and scrapers. The tool head 14 has a body 15 with a front side 16, and back side 17 (FIG. 3), a leading edge 18, side edges 30, 32, a medial portion 20, and a rear edge 22. Each of the edges 18, 22, 30, 32 has a face 19, 23, 31 (FIG. 6), 33 (FIG. 4) respectively, that extends between the front side 16 and the back side 17. Typically, the tool head rear edge 22 includes a socket 24 structured to be coupled to the handle 12. The tool head 14 is structured to engage a substrate such as, but not limited to, dirt, soil, sand, gravel, loam, silt, earth or any combination thereof. The tool head leading edge 18 is structured to initially penetrate the substrate prior to the body medial portion 20 entering the substrate. In the embodiment shown in FIGS. 1 and 2, the tool head 14 is a shovel head 26 wherein the tool head leading edge 18 approximates the shape of a parabola having a generally forwardly extending curved edge 28 at the middle of the body 15 and which extends to the two generally parallel, opposing side edges 30, 32.

The tool head 14 includes a coating 40 of a hardness enhancing material. The coating 40 may be selected from the group comprising: tungsten carbides, chromium carbides, titanium, aluminum bronze or any of the afore mentioned materials. The coating 40 is preferably applied to the tool head 14 as a spray by such methods as a high velocity oxy-fuel process or an electric arc spray. The coating 40 is disposed on the tool head leading edge 18 in a pattern having a leading edge 42 and a rear edge 44, thereby defining a coated portion 46 of the body 15 and an uncoated portion 48 of the body 15. Typically, the coating leading edge 42 corresponds to the tool head leading edge 18. The coating 40 also typically covers the leading edge face 19.

Figure 2:
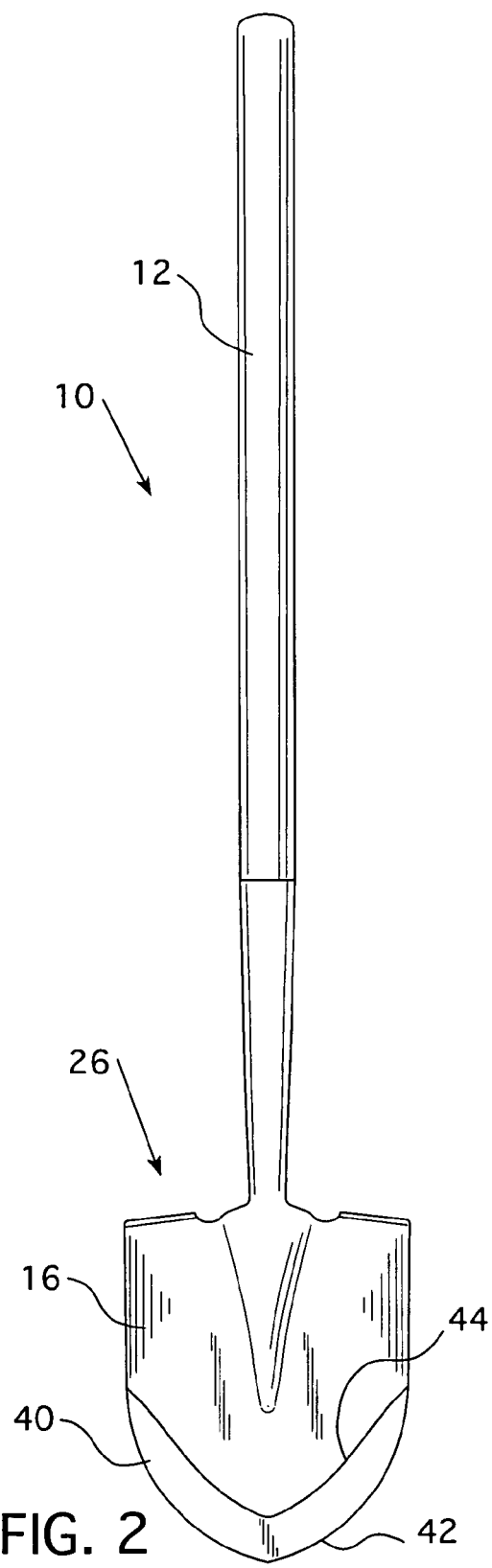
FIG. 2 is a front view of a garden tool with a coated tool head.
Figure 3:
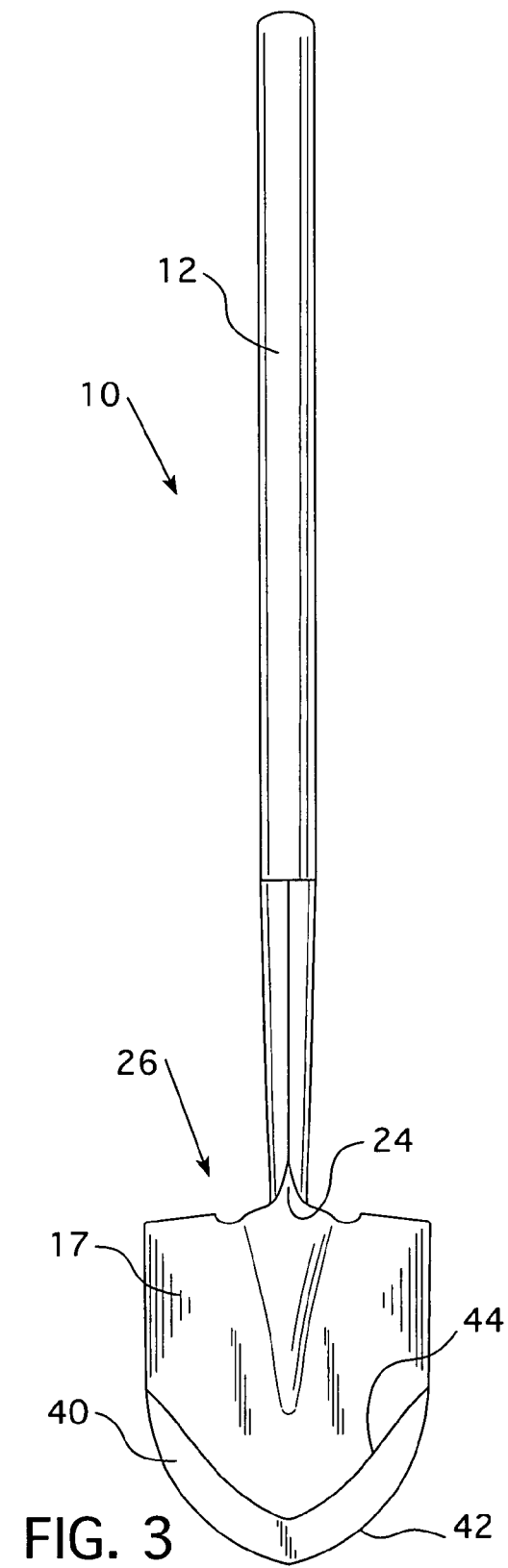
FIG. 3 is a back view of a garden tool with a coated tool head.
Figure 4:
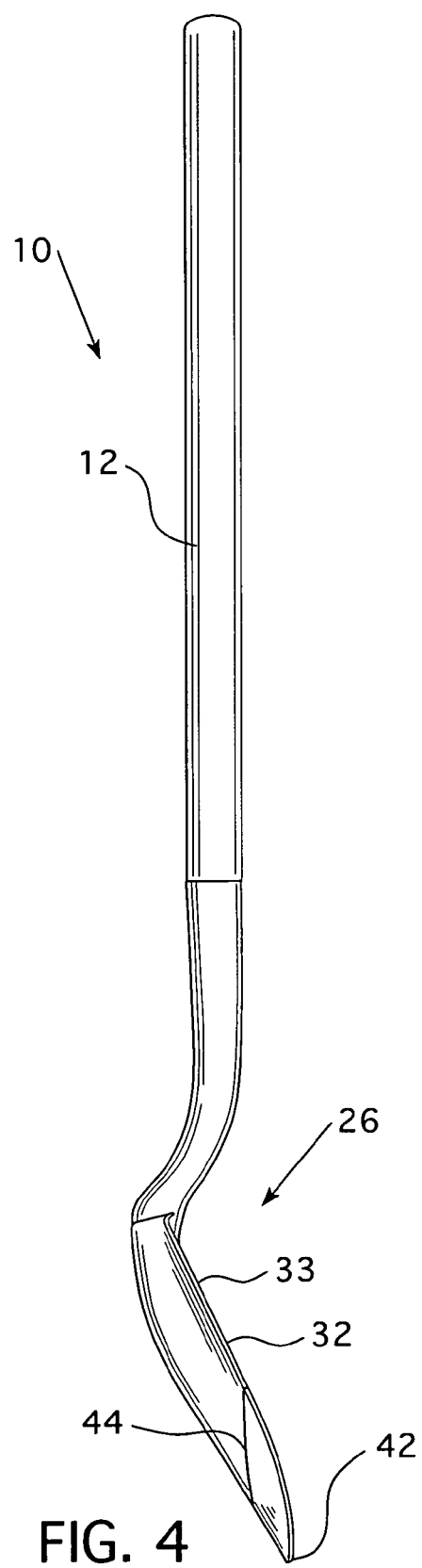
FIG. 4 is a first side view of a garden tool with a coated tool head.
Figure 5:
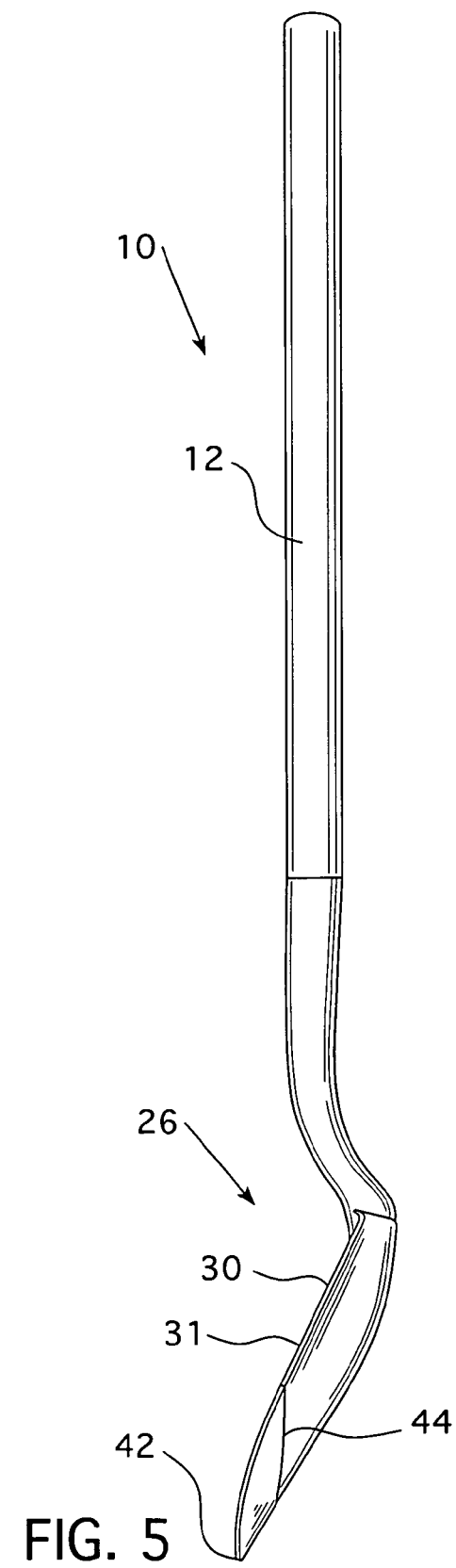
FIG. 5 is a second side view of a garden tool with a coated tool head.
Figure 6:
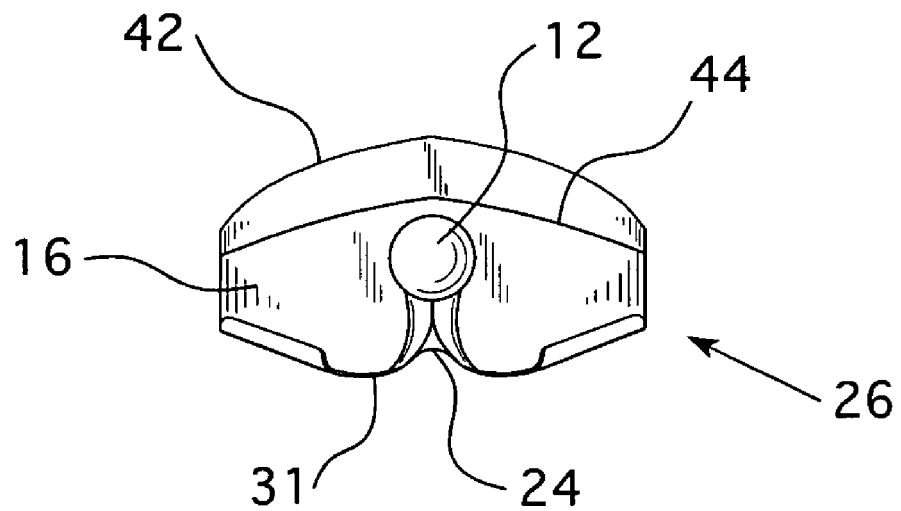
FIG. 6 is a top side view of a garden tool with a coated tool head.
Figure 7:
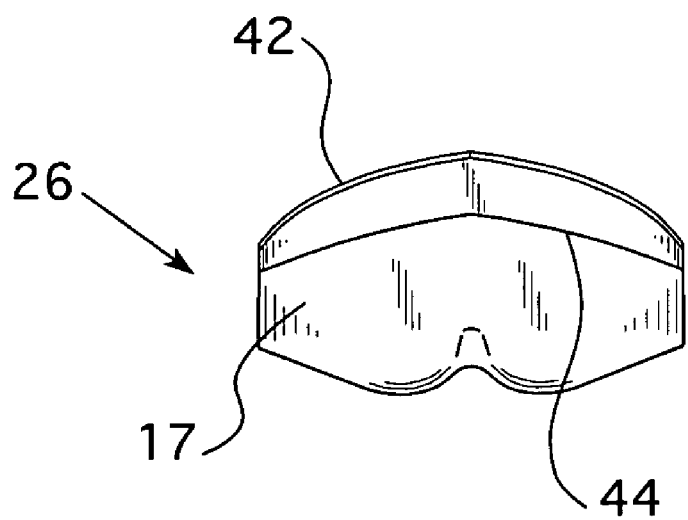
FIG. 7 is a bottom side view of a garden tool with a coated tool head.
Figure 8:
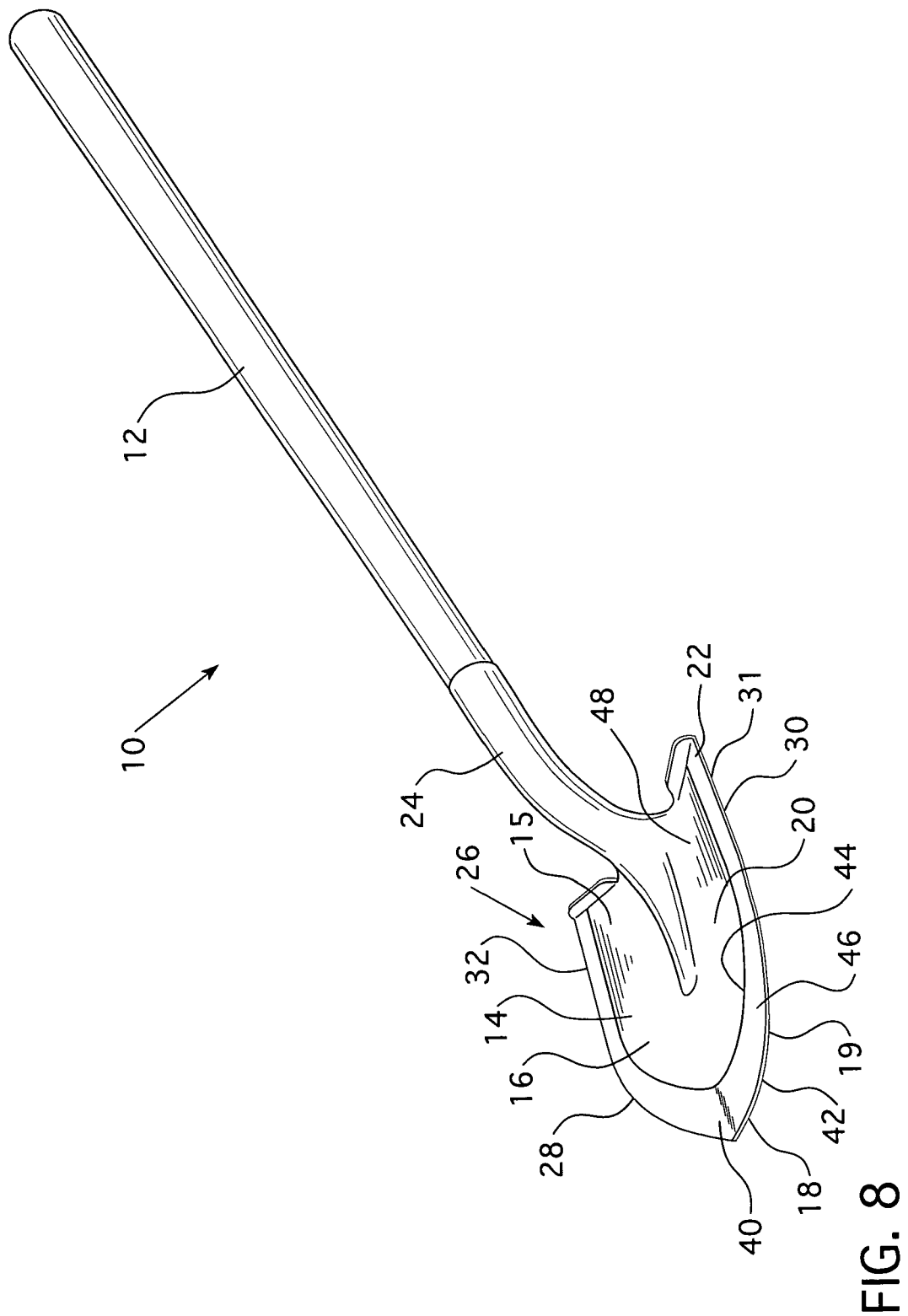
FIG. 8 is an isometric view of a garden tool with a coated tool head with another coating pattern.
Figure 13:
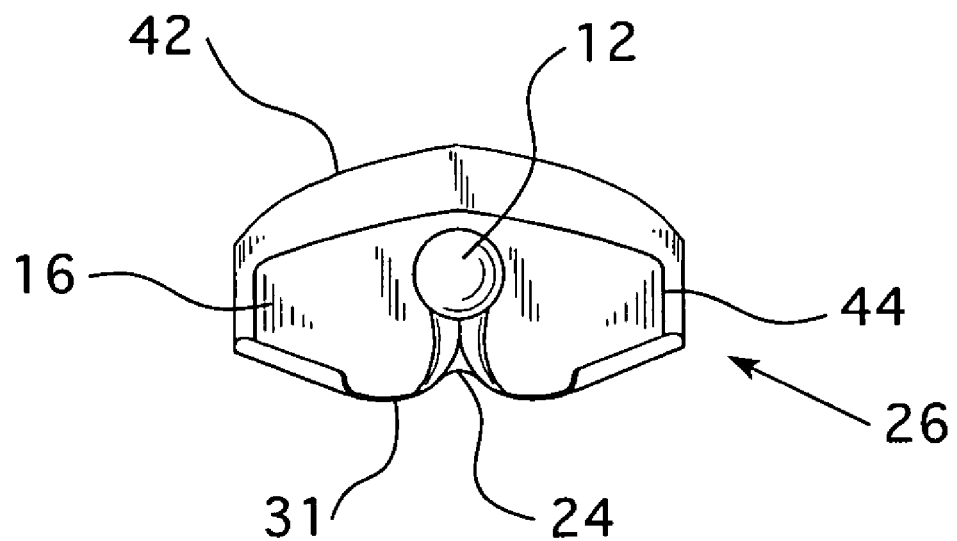
FIG. 13 is a top side view of a garden tool with a coated tool head with another coating pattern.
Figure 14:
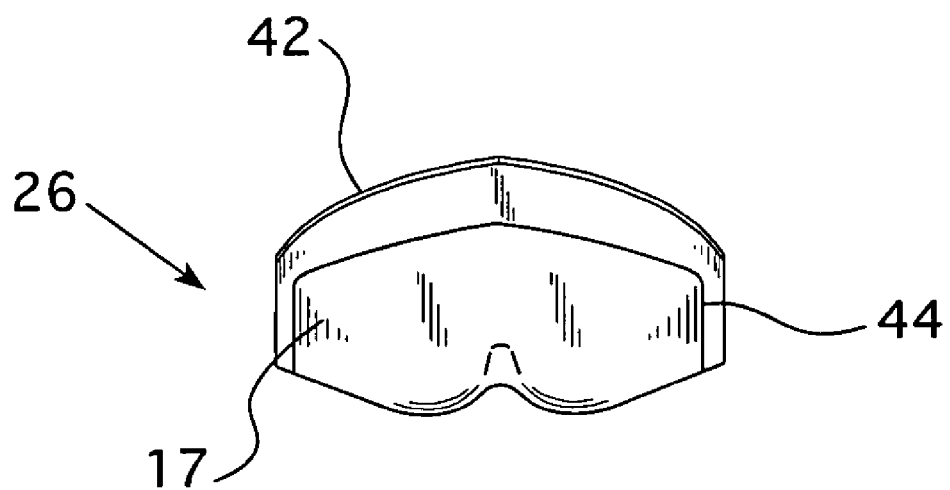
FIG. 14 is a bottom side view of a garden tool with a coated tool head with another coating pattern.
Figure 15:
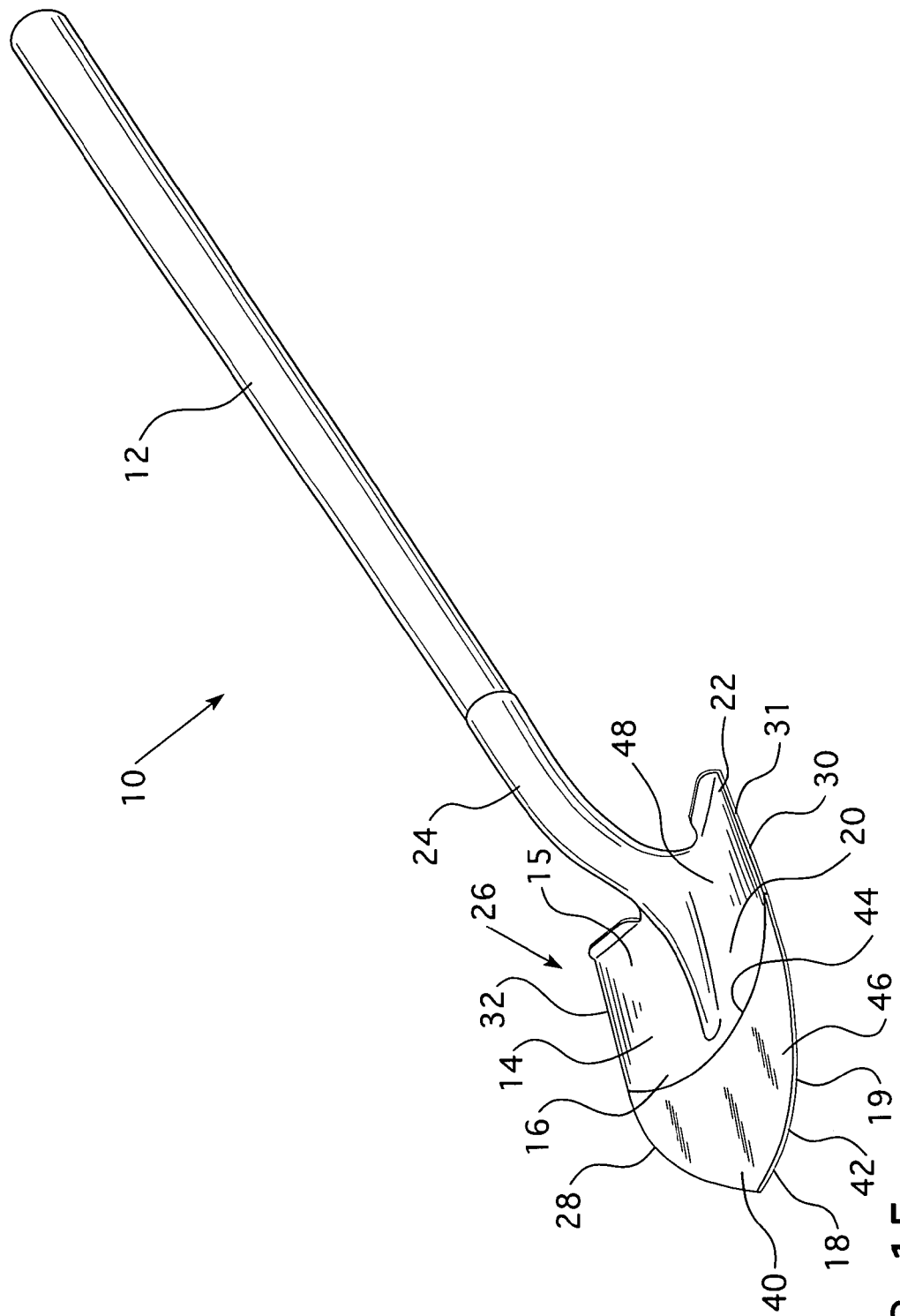
FIG. 15 is an isometric view of a garden tool with a coated tool head with another coating pattern.
Figure 18:
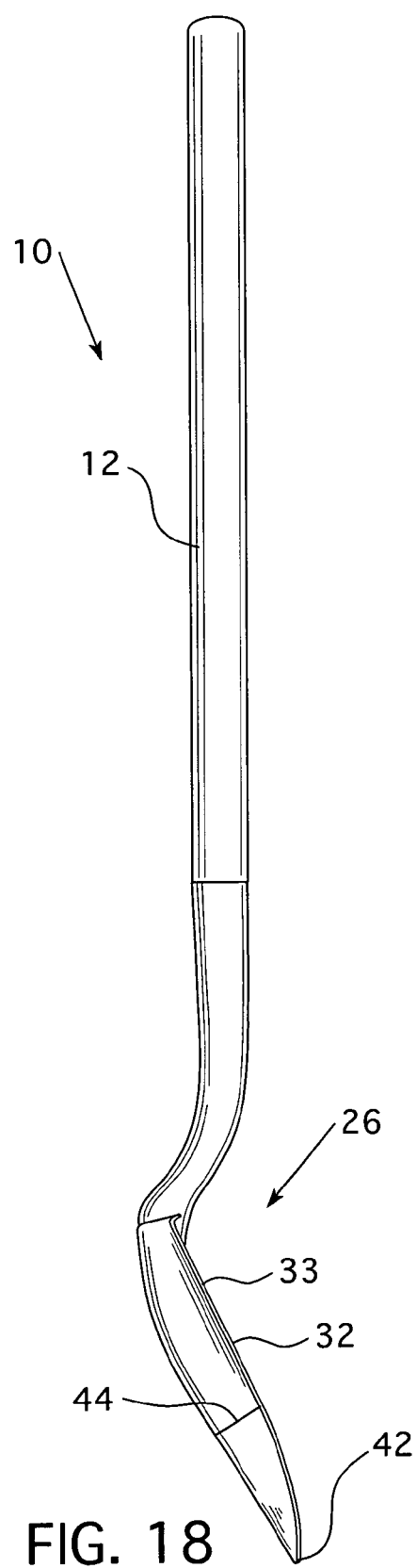
FIG. 18 is a first side view of a garden tool with a coated tool head with another coating pattern.
Figure 19:
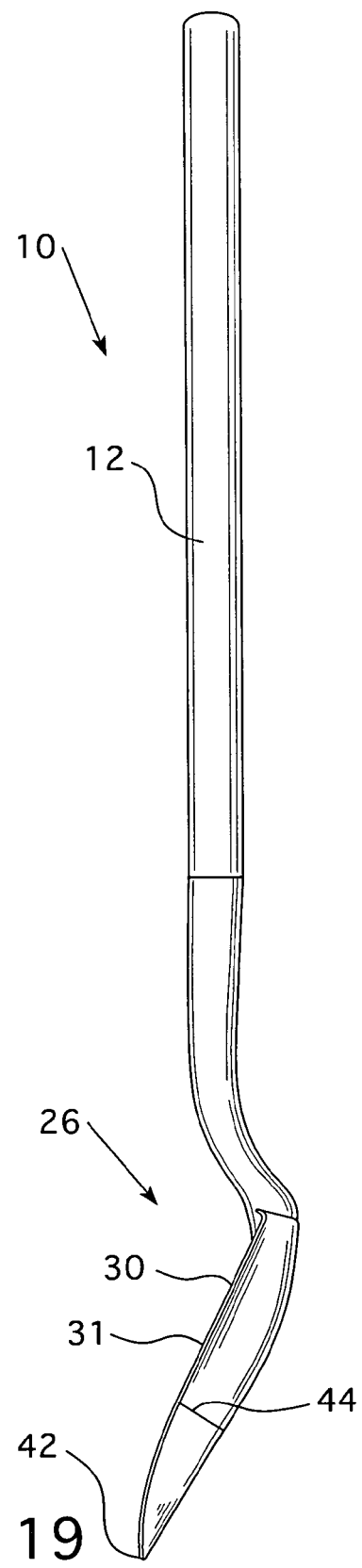
FIG. 19 is a second side view of a garden tool with a coated tool head with another coating pattern.
Figure 20:
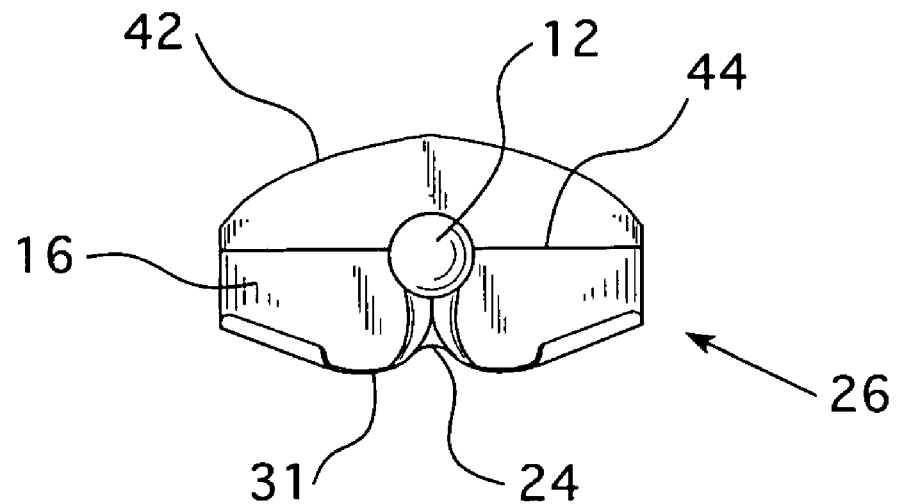
FIG. 20 is a top side view of a garden tool with a coated tool head with another coating pattern.
Figure 21:
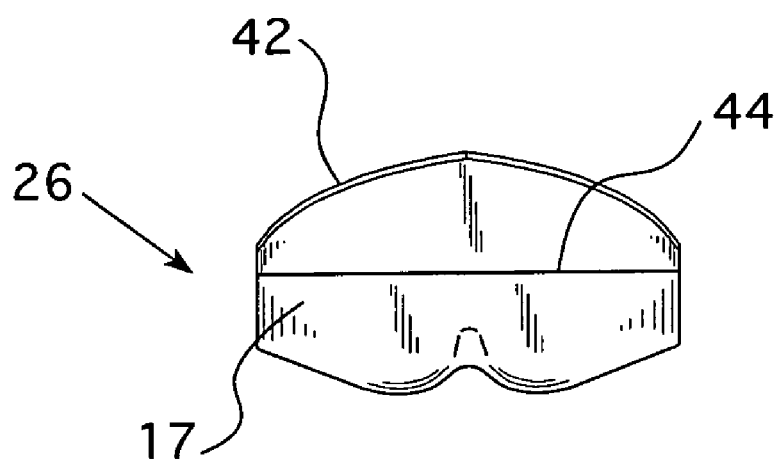
FIG. 21 is a bottom side view of a garden tool with a coated tool head with another coating pattern.
Figure 22:
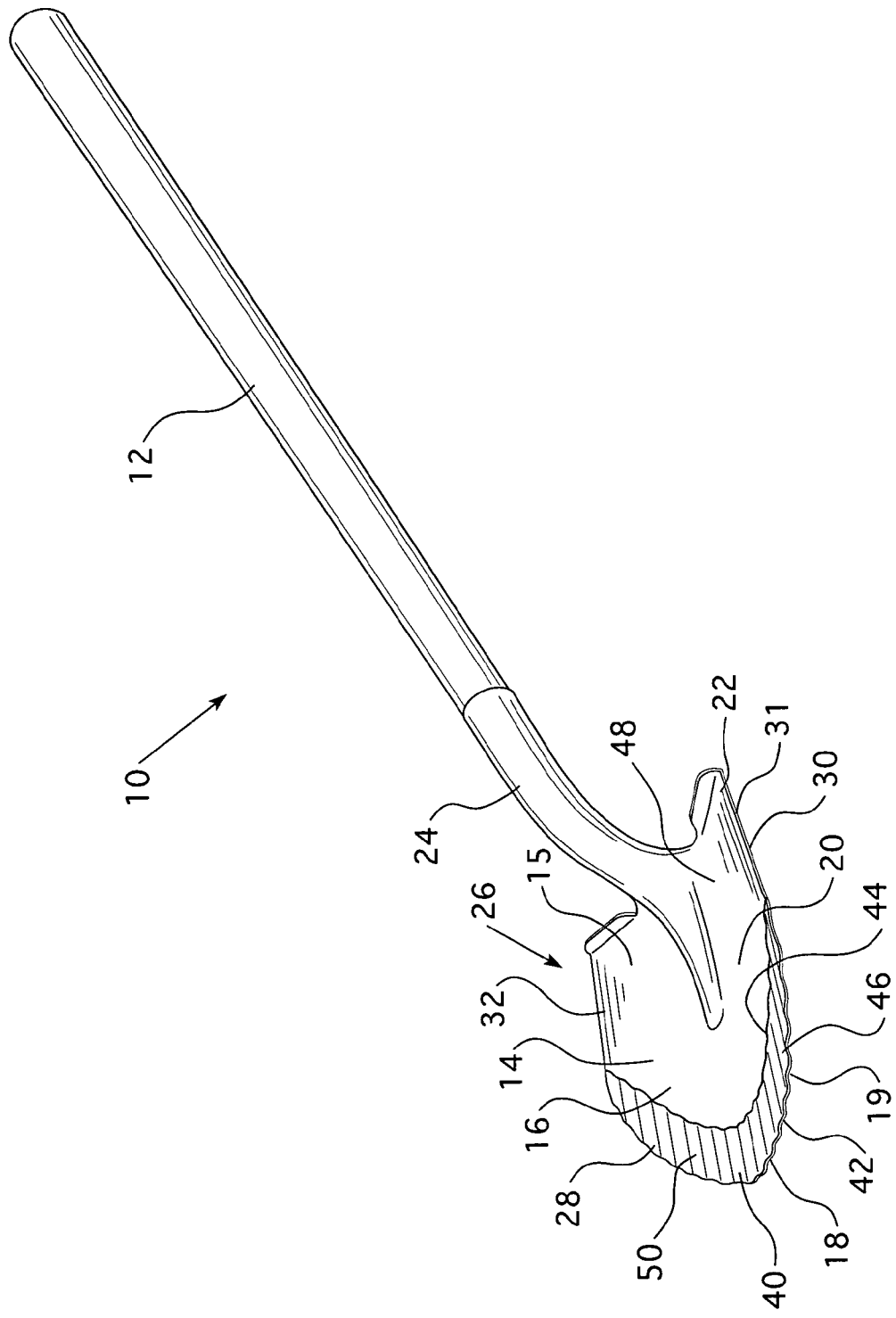
FIG. 22 is an isometric view of a garden tool with a coated tool head with another coating pattern.
Figure 25:
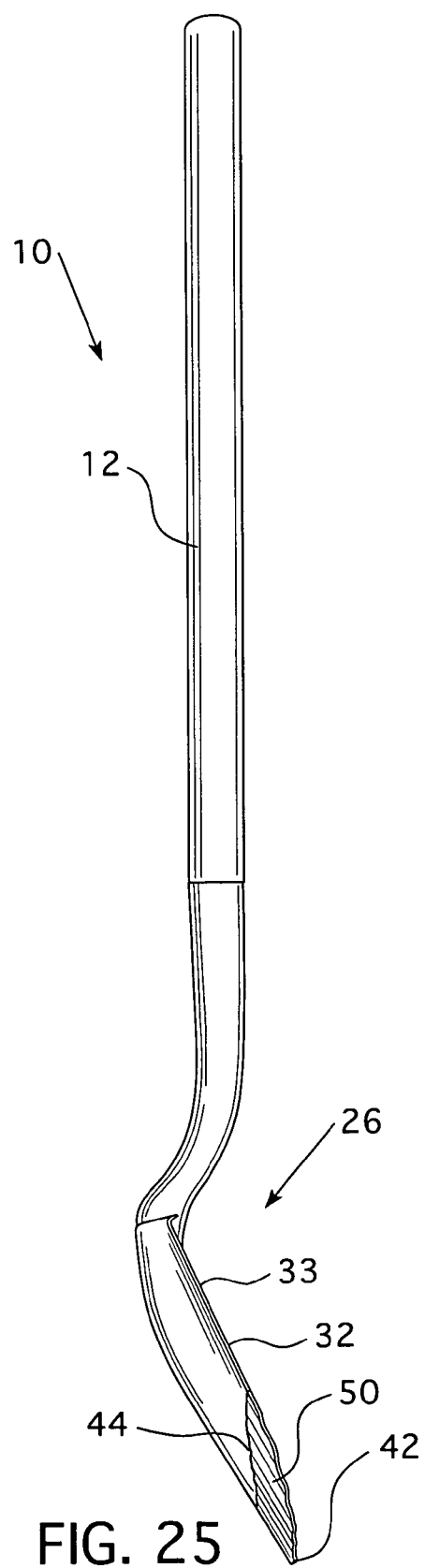
FIG. 25 is a first side view of a garden tool with a coated tool head with another coating pattern.
Figure 26:
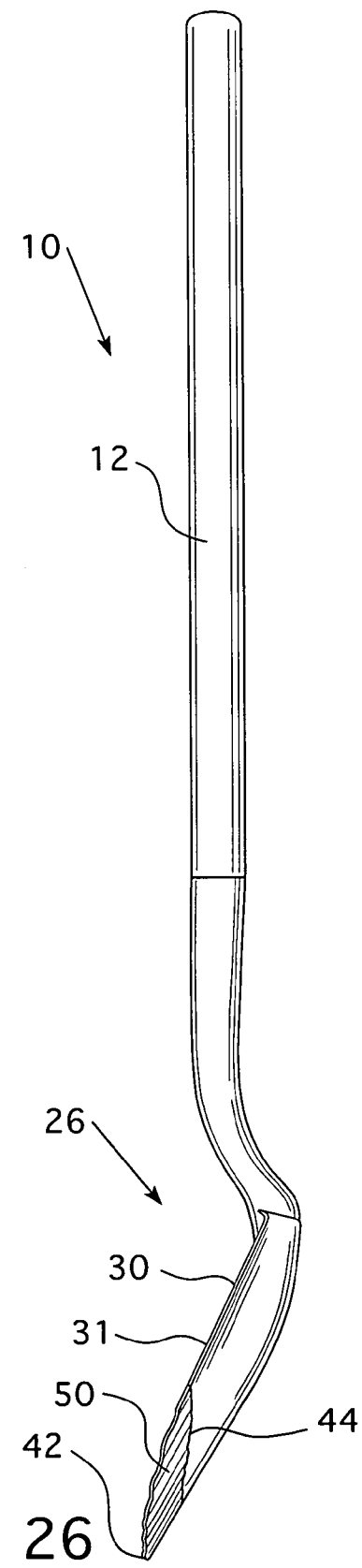
FIG. 26 is a second side view of a garden tool with a coated tool head with another coating pattern.
Figure 27:
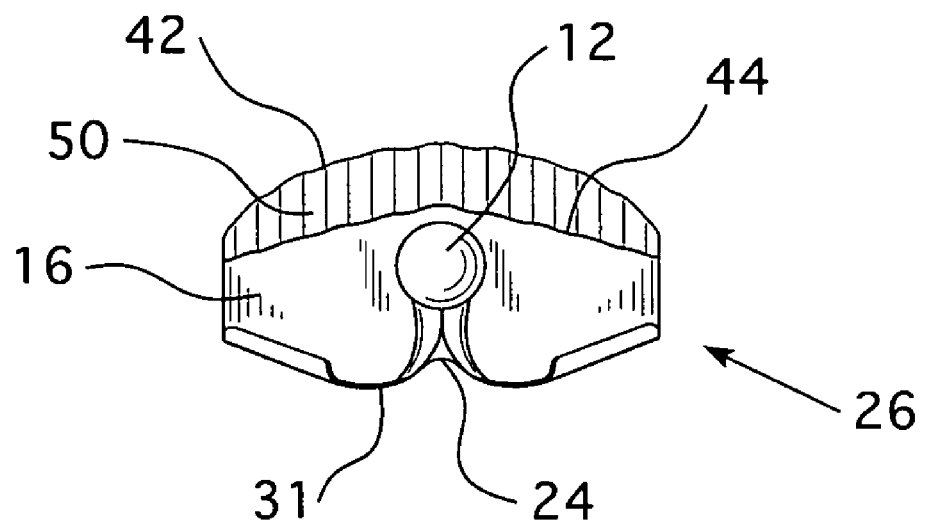
FIG. 27 is a top side view of a garden tool with a coated tool head with another coating pattern.
Figure 28:
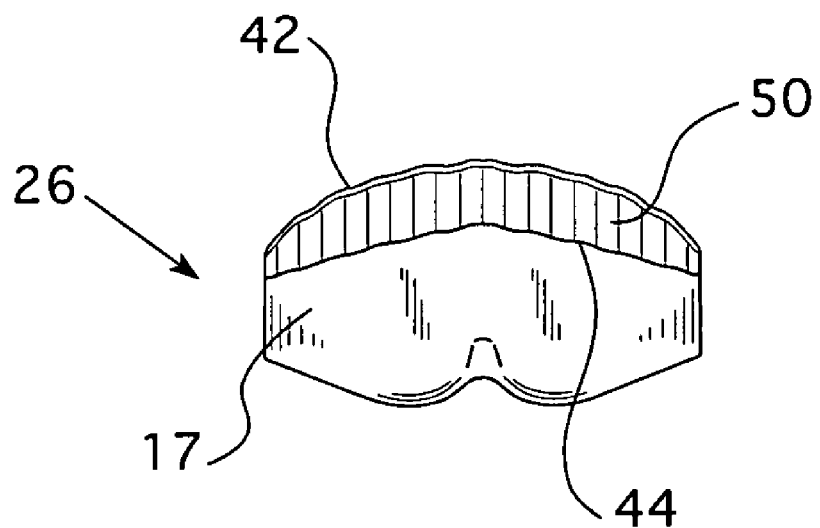
FIG. 28 is a bottom side view of a garden tool with a coated tool head with another coating pattern.

By controlling the shape of the spray stream, the pattern of the applied coating 40 may be selected from any pattern; however, in a preferred embodiment, the tool head 14 is covered with a masking material 36, such as but not limited to, masking tape 38 during the application of the coating 40. By utilizing a masking material 36 (shown in ghost), the pattern of the coating 40 on the tool head 14 may be controlled. For example, as shown in FIGS. 1-7, the coating 40 on the tool head front side 16 is disposed in a pattern wherein the coating rear edge 44 is spaced about one inch from the tool head leading edge 18 and generally corresponds to the shape of the tool head leading edge 18 over the length of the curved edge 28 and tapers to meet the two generally parallel, opposing side edges 30, 32. As shown on FIG. 3, the pattern of the coating 40 on the tool head back side 17 may be generally the same as the pattern of the coating 40 on the tool head front side 16 (FIG. 2).

However, it is understood that the pattern of the coating 40 on the tool head back side 17 may be different than the pattern of the coating 40 on the tool head front side 16. For example, the shape of the coating rear edge 44 may correspond to the shape of the tool head leading edge 18 over both the curved edge 28 as well as the two generally parallel, opposing side edges 30, 32 as shown in FIGS. 8-15. Thus, for example, the garden tool 10 may have the coating 40 applied on the tool head front side 16 as shown in FIG. 2 and applied to the tool head back side 17 as shown in FIG. 10. Any of the patterns of the coating 40 described herein may be applied to either of the tool head front side 16 and/or the tool head back side 17.

The coating 40 may also be applied to the tool head 14 by dipping the tool head 14 into a reservoir containing the hardness enhancing material. Thus, provided the tool head 14 was maintained in a generally vertical orientation while being dipped, the coating 40 would be disposed in a pattern wherein the coating rear edge 44 extends generally laterally across the tool head front side 16, as shown in FIGS. 16-21 however, the tool head 14 may also be covered with a masking material 36 while the tool head 14 is being dipped, thereby allowing control over the resulting coating 40 pattern.

Further, depending upon the nature of the hardness enhancing material, the masking material 36 may be used to conserve the hardness enhancing material. For example, if the hardness enhancing material is in a water-based solution, a hydrophobic masking material 36 may be used to repel the hardness enhancing material from the masking material 36 and return the solution to the reservoir as the tool head 14 is lifted from the reservoir.

As shown in FIGS. 22-28, the tool head 14 may include other structural elements such as, but not limited to, a corrugated portion 50 disposed adjacent to the leading edge 18. As shown, the corrugated portion 50 is disposed in a pattern wherein the corrugated portion 50 extends about one inch from the tool head leading edge 18 and generally corresponds to the shape of the tool head leading edge 18 over the length of the curved edge 28 and tapers to meet the two generally parallel, opposing side edges 30, 32. In such a configuration, the coating 40 is preferably applied over the corrugated portion 50. Further, as shown in FIG. 24, the coating 40 may include a particulate matter resulting in a coating 40 with a gritty or specked appearance.

Figure 29:
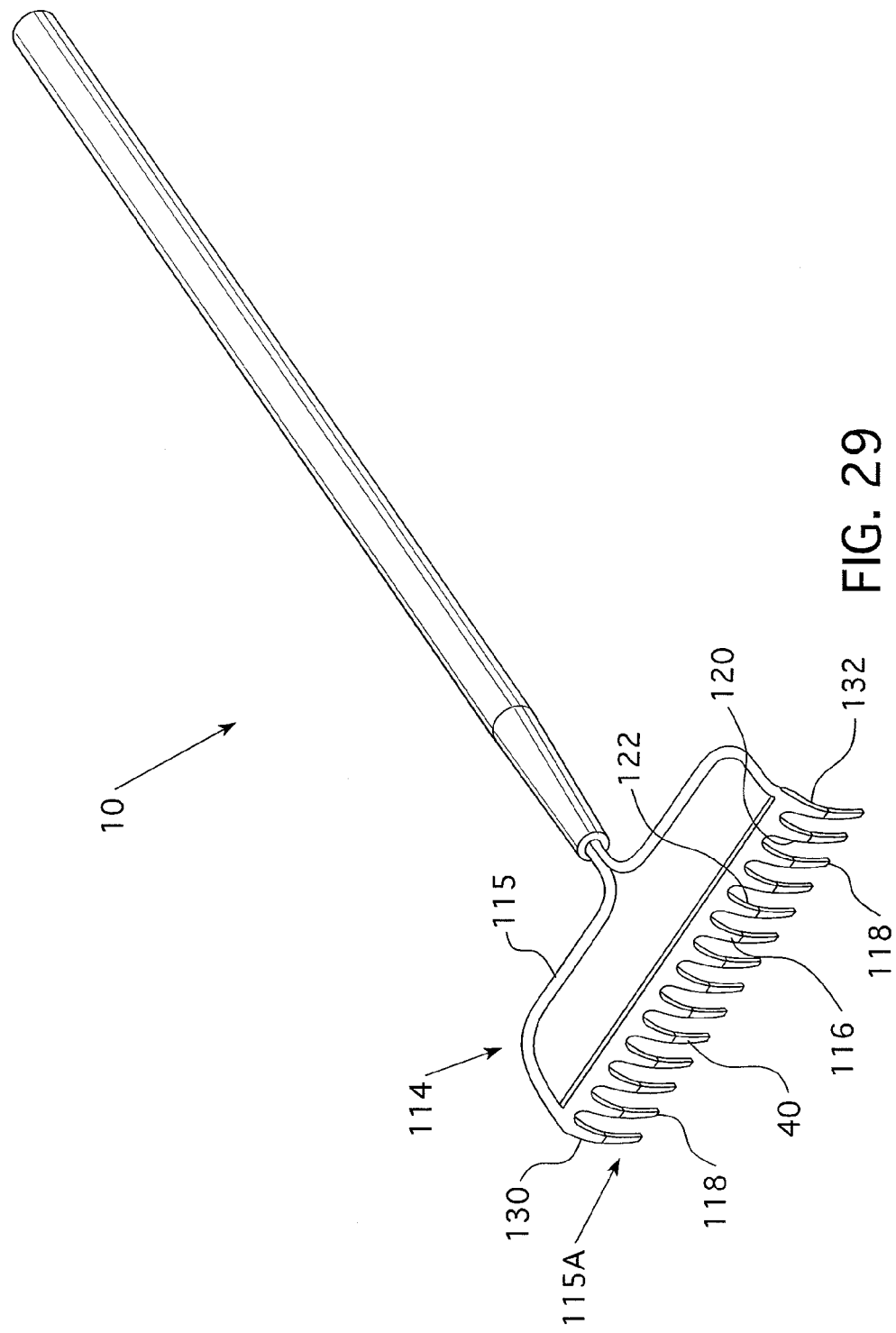
FIG. 29 is an isometric view of a rake with a coated tool head.

As shown in FIG. 29, the tool head 114 is a rake. The rake tool head 114 includes a base 115 having a plurality of tines 115A extending generally perpendicular thereto. As before, the base 115 and the plurality of tines 115A have a forward side 116, and back side (not shown), and each tine 115A has a leading edge 118, side edges 130, 132, a medial portion 120, and a rear edge 122. In this embodiment, the coating 40 is typically applied to all sides of the distal end of the tines 115A; however, as noted above, a masking material 36 may be applied to those portions of the tool head 114 that should remain free from the coating 40, or a well controlled spray may be used to limit the application of the coating 40 to selected areas of the tool head 114.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A garden tool comprising:
   an elongated handle;
   a tool head having a body with a front side, and back side, a leading edge, side edges, a medial portion, and a rear edge;
   said tool head rear edge having a socket structured to be coupled to said handle;
   said tool head coupled to said handle at said socket;

said tool head having a coating disposed on said tool head leading edge; and said coating having a pattern with a leading edge and a rear edge:

wherein said tool head is a shovel head having a leading edge with a generally forwardly extending curved edge at the middle of said body and which extends to two generally parallel, opposing side edges;

wherein said coating leading edge corresponds to said tool head leading edge;

said coating rear edge corresponds to the shape of said tool head leading edge over said curved edge, said coating rear edge being spaced about one inch from said coating leading edge at said curved edge; and said coating rear edge tapering to meet said side edges.

2. A garden tool comprising:

an elongated handle;

a tool head having a body with a front side, and back side, a leading edge, side edges, a medial portion, and a rear edge;

said tool head rear edge having a socket structured to be coupled to said handle;

said tool head coupled to said handle at said socket;

said tool head having a coating disposed on said tool head leading edge;

said coating having a pattern with a leading edge and a rear edge:

wherein said tool head is a shovel head having a leading edge with a generally forwardly extending curved edge at the middle of said body and which extends to two generally parallel, opposing side edges;

wherein said coating leading edge corresponds to said tool head leading edge;

said coating rear edge corresponds to the shape of said tool head leading edge over said curved edge and said side edges; and said coating rear edge being spaced about one inch from said coating leading edge.

* * * * *